United States Patent [19]

Nakayama et al.

[11] 4,130,526
[45] Dec. 19, 1978

[54] AQUEOUS COATING COMPOSITION

[75] Inventors: Yasuharu Nakayama; Tadashi Watanabe; Reiziro Nishida, all of Hiratsuka; Satoru Enomoto, Tokyo, all of Japan

[73] Assignee: Kansai Paint Co., Ltd., Tokyo, Japan

[21] Appl. No.: 811,563

[22] Filed: Jun. 30, 1977

[30] Foreign Application Priority Data

Jul. 5, 1976 [JP] Japan .................... 51-80274

[51] Int. Cl.² .............................. C08L 33/00
[52] U.S. Cl. ...................... 260/29.6 RB; 260/23 EM;
260/23 AR; 260/23.7 A; 260/29.7 UA;
568/592; 568/596
[58] Field of Search ............... 260/29.6 RB, 29.7 UA,
260/615 A, 23 EM, 23 AR, 23.7 A

[56] References Cited

U.S. PATENT DOCUMENTS

| | | | |
|---|---|---|---|
| 2,795,564 | 6/1957 | Conn et al. | 260/29.6 WB |
| 3,880,793 | 4/1975 | Nakayama | 260/29.7 UA |
| 3,956,217 | 5/1976 | Gazeley | 260/29.6 NE |
| 3,985,698 | 10/1976 | Matsudaira et al. | 260/29.6 RW |
| 4,008,283 | 2/1977 | Enomoto et al. | 260/615 A |
| 4,021,390 | 5/1977 | Enomoto et al. | 260/22 CB |
| 4,033,920 | 7/1977 | Isozaki et al. | 260/29.6 H |

*Primary Examiner*—Melvyn I. Marquis
*Attorney, Agent, or Firm*—Ostrolenk, Faber, Gerb & Soffen

[57] ABSTRACT

An aqueous coating composition which is prepared by radially polymerizing unsaturated vinyl monomer with ionic or nonionic surface active agent, and impregnating the obtained emulsion with a compound (A) that is represented by the general formula:

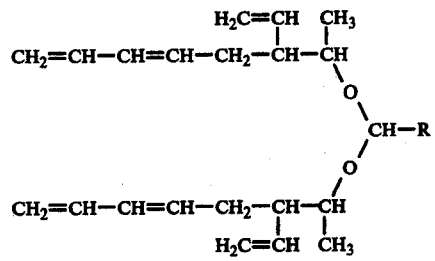

10 Claims, No Drawings

AQUEOUS COATING COMPOSITION

BACKGROUND OF THE INVENTION

This invention relates to an aqueous coating composition. More particularly, the invention relates to an aqueous coating composition of improved vinyl polymer emulsion which is prepared by radically polymerizing unsaturated vinyl monomer with a surface active agent of ionic or nonionic compound.

The emulsion is very useful as the resin material for preparing pollution-free coating compositions, so that it has been employed for various purposes. The emulsion has, however, a disadvantage that the lowest film-forming temperature thereof is not compatible with the hardness of the coating film formed by using the emulsion. In other words, when the lowest film-forming temperature is lowered to a sufficient degree, the film hardness becomes insufficient, and to the contrary, when the film hardness is made high enough, the emulsion cannot be used practically at lower temperatures. If an organic solvent is added to the emulsion to eliminate this defect, the advantage of non-pollution will be lost.

In order to eliminate the above-described defects in the prior art, the inventors of the present application have carried out various extensive studies, and as the result, it has been found out that the following compound (A) facilitates the rapid curing of emulsion since the permeability and plasticizing effect of the compound (A) to the emulsion are quite excellent and the rate of oxidation curing is large. Further, the compound (A) is free from pollution as it does not evaporate, therefore, the present invention has been accomplished.

BRIEF SUMMARY OF THE INVENTION

It is, therefore, the primary object of the present invention to provide an improved aqueous coating composition in which the lowest film-forming temperature is compatible with the hardness of the formed coating films.

Another object of the present invention is to provide an aqueous coating composition which can be applied to the surfaces of various articles without causing air pollution.

A further object of the present invention is to provide an aqueous coating composition which can be cured rapidly but forms the coating films having excellent properties.

Still a further object of the present invention is to provide an aqueous coating composition which can be prepared without difficulty at low cost in industrial practices.

In accordance with the present invention, the aqueous coating composition is prepared by impregnating an emulsion with the following compound (A), in which the above emulsion is produced by radically polymerizing unsaturated vinyl monomer in the presence of a surface active agent of known ionic or nonionic low molecular or polymeric compound. The above compound (A) is represented by the general formula:

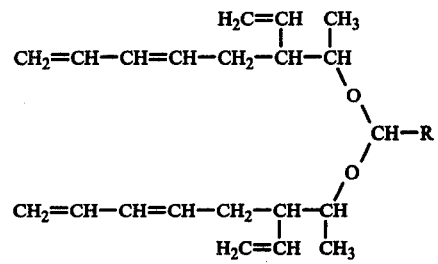

in which R is a hydrogen atom, or an alkyl group having 1 to 18 carbon atoms, phenyl group, alkyl ($C_{1-18}$) phenyl group, cyclohexyl group of alkyl ($C_{1-18}$) cyclohexyl group.

The above aqueous coating composition of the present invention has a lowest film-forming temperature of a sufficiently low value, while it forms coating films having excellent properties including quite large hardness.

DETAILED DESCRIPTION OF THE INVENTION

The surface active agents used for preparing the emulsion of the present invention are commonly used ones of anionic, cationic or nonionic and low molecular or polymeric compounds. Exemplified as the anionic surface active agents are fatty acid salts, salts of higher alcohol sulfuric esters, sulfates of aliphatic amines and aliphatic amides, salts of aliphatic alcohol phosphoric esters, aliphatic amide sulfonates and alkylaryl sulfonates. As the cationic surface active agents, there are exemplified salts of aliphatic amines, quaternary ammonium salts and alkylpyridinium salts. Further, the nonionic surface active agents are exemplified by polyoxyethylene alkyl ether, polyoxyethylene alkylphenol ether, polyoxyethylene alkyl ester and sorbitan alkyl ester.

The unsaturated vinyl monomers used for the preparation of the emulsion in the present invention, are radically polymerizable ones. For example, there are ethylene, propylene, butylene, vinyl chloride, vinylidene chloride, vinyl acetate, Veova monomer (General formula is

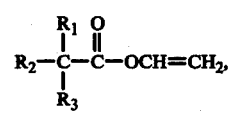

wherein $R_1$, $R_2$ and $R_3$ are saturated alkyl groups: trademark, made by Shell Chemical Co.), styrene, α-methylstyrene, vinyltoluene, vinylpyridine, butadiene, pentadiene, chloroprene, isoprene, acrylic acid, methacrylic acid, acrylic esters, methacrylic esters, glycidyl acrylate, glycidyl methacrylate, 2-hydroxyethyl methacrylate, 2-hydroxyethyl acrylate, 2-hydroxypropyl acrylate, 2-hydroxypropyl methacrylate, acrylonitrile and methacrylonitrile.

The compound (A) used for the impregnation to the emulsion in the present invention is prepared by the condensation of precursory material of 1-methyl-2-vinyl-4,6-heptadiene-1-ol with aldehydes that are represented by the general formula: RCHO. Such aldehyde to be used may be selected from the group consisting of aliphatic aldehydes, alicyclic aldehydes and aromatic aldehydes having 1 to 18 carbon atoms, above all, preferable ones are aliphatic aldehydes, especially those having 8 or less carbon atoms such as formaldehyde, acetaldehyde, butyraldehyde and octylaldehyde.

The ratio of impregnation of the compound (A) is 0.1–150 PHR (parts per hundred parts of resin), preferably 3–50 PHR to the solid content of the emulsion.

When the compound (A) is impregnated, although it can be used by mixing as it stands, it is preferable that the compound (A) is previously emulsified or solubilized by adding oxidation curing water-soluble resin or common emulsifying agent so as to prevent the occurrence of troubles such as lump formation. The above oxidation curing water-soluble resin may be exemplified by maleinized polydiene, maleinized alkyd, maleinized fatty acid-modified epoxy resin, maleinized oil, maleinized stand oil, maleinized boiled oil, maleinized fatty acid-modified acrylic resin and fatty acid-modified acrylic resin. They are suitable for the emulsification of the compound (A) and they are advantageous in that they do not exert bad influence on the properties of coating film by self-curing since they have good storage stability. Further, water-soluble alkyd resin and oil-modified water-soluble epoxy resin can also be used. Furthermore, even when the above-mentioned anionic, cationic and nonionic surface active agents are used, the compound (A) does not receive any bad influence from the use of surface active agents because the compound (A) is easily dispersed as it has low molecular weight, large oiliness and high curing rate.

The quantities of the above-described self-curing water-soluble resins to be used are not restricted, however, the preferable quantities may be less than 300%, more preferably less than 50% relative to the solid content in the emulsion. In the case of the latter common surface active agents, the quantities of use may be 10% or less, or preferably less than 5%.

The aqueous coating composition of the present invention can be advantageously used for forming coating films at ordinary temperatures, however, the composition can be thermally cured or it can be combined with other cross-linking agents.

The improved emulsion of the present invention can be used not only for coating but also for the preparation of several adhesives and resin processing agents.

In order that those skilled in the art may better understand the present invention and the manner in which it is practiced, the following specific examples are given. In these examples, unless otherwise indicated, parts and percents are by weight.

EXAMPLE 1

A mixture of monomers in a compounding ratio of: styrene/n-butyl acrylate/acrylic acid = 38.2/59.8/2, was prepared. Also a mixture of surface active agents in a compounding ratio of: Triton X-200/Emulgen 911/Epan 410 = 1/1/0.5, was prepared. 25% of the mixture of surface active agents was added to the former mixture of monomers, and an emulsion (I) containing 50% of solid component was synthesized by the conventional method.

Meanwhile, to the compound (A) of the general formula having $CH_3$ as R, were added 0.16% (as metal) of cobalt naphthenate, 0.16% (as metal) of manganese naphthenate and 0.45% (as metal) of lead naphthenate. Further, 10% of Noigen EA 143, 10% of Sorgen TW 60 and 2.5% of polyethylene glycol 4000(m.w.: 4000) was added to the above mixture and then 50% of water was still added and the mixture was emulsified with stirring to prepare an emulsion (II).

Five parts (as compound (A)) of the emulsion (II) was added to 100 parts (as solid) of the emulsion (I) with stirring to prepare a homogeneous emulsion. The properties of this emulsion are shown in the following Table 1.

Notes: The trademarks of the raw materials described in the above were as follows:

Triton X-200: Surface active agent represented by the following general formula $$C_9H_{19}-O-\underset{}{\bigcirc}-(RO)_{\overline{n}}SO_3Na,$$

wherein R is a mixture of $-CH_2-CH_2-$ and $-CH-CH_2-$, and n is about 30,
$\quad\quad\quad\quad\quad\quad\quad\;\;|$
$\quad\quad\quad\quad\quad\quad\;\;CH_3$ made by Rohm & Haas Corp.

Emulgen 911: Surface active agent: polyoxyethyenenonylphenyl ether $$[C_9H_{19}-\underset{}{\bigcirc}-O-(CH_2CH_2O)_{\overline{n}}H]$$

having 13.7 of HLB (hydrophile lipophile balance) made by Kao Atlas Co., Ltd.

Epan 410: Surface active agent; polypropyleneglycolpolyethyleneglycol ether $$[HO-(CH_2CH_2O)_{\overline{m}}-(CH-CH_2-O)_{\overline{n}}H],$$
$\quad\quad\quad\quad\quad\quad\quad\quad\quad\;\;|$
$\quad\quad\quad\quad\quad\quad\quad\quad\;\;CH_3$ made by Dai-ichi Kogyo Seiyaku Co., Ltd.

Noigen EA 143: Surface active agent; polyoxyethylenedodecyl phenyl ether $$[C_{12}H_{25}-\underset{}{\bigcirc}-O-(CH_2CH_2O)_{\overline{n}}H]$$

having 14 of HLB, made by Dai-ichi Kogyo Seiyaku Co., Ltd.

Sorgen TW 60: Surface active agent; polyethyleneglycol sorbitan monostearate $$\begin{array}{c} \quad\quad O \\ \quad\;/\;\;\;\backslash \\ CH_2\quad CH-CH_2OCO-(CH_2)_{\overline{16}}-CH_3 \\ |\quad\quad | \\ HO-(CH_2CH_2O)_{\overline{x}}CH\quad CH-O-(CH_2CH_2O)_{\overline{x}}H \\ \quad\backslash\quad / \\ \quad CH \\ \quad\;| \\ \quad O-(CH_2CH_2O)_{\overline{n}}H \end{array}$$

having 14.9 of HLB, made by Dai-ichi Kogyo Seiyaku Co., Ltd.

EXAMPLES 2–4

The compounding ratio of emulsions (I) and (II) in Example 1 was changed to 100/10, 100/20 and 100/40 so as to prepare other three kinds of homogeneous emulsions. The properties of these emulsions are shown in the following Table 1.

EXAMPLE 5

By using 1% of Emal O (trademark of surface active agent consisting of sodium lauryl sulfate $C_{12}H_{25}OSO_3Na$ made by Kao Atlas Co., Ltd.), an emulsion (III) containing 50% of solid content was prepared by the conventional method from a monomer mixture of Veova monomer (trademark, made by Shell Chemical Co.)/vinyl acetate = 40/60.

A homogeneous emulsion was prepared by mixing the materials in the ratio of: emulsion (III)/emulsion (II) in Example 1 (as compound (A)) = 100/5 (as solid). The properties of thus obtained emulsion are shown in the following Table 1.

EXAMPLE 6

An emulsion was prepared by using materials in the ratio of: DM-60 (trademark of styrene-butyl acrylate emulsion made by Hoechst Synthetics Co., Ltd.)/emulsion (II) (as compound (A)) = 100/5 (as solid). The properties of thus prepared emulsion are shown in the following Table 1.

EXAMPLE 7

An emulsion was prepared by using materials in the ratio of: P-3 Emulsion (trademark of vinyl acetate ethylene emulsion made by Showa Highpolymer Co., Ltd.)/emulsion (II) (as compound (A)) = 100/5 (as solid). The properties of thus prepared emulsion are shown in the following Table 1.

COMPARATIVE EXAMPLE 1

The emulsion (I) in Example 1 was solely used.

COMPARATRIVE EXAMPLE 2

The composition used in this example was prepared by adding 10 PHR of tricresyl phosphate to the mixed emulsion used in Example 1.

COMPARATIVE EXAMPLES 3-5

In these Comparative Examples, the emulsion (III), DM-60 emulsion and P-3 emulsion that were used in Examples 5-7, were used solely.

TEST ITEMS

Lowest film-forming temperature: A commercially available emulsion paint of vinyl chloride-vinyl acetate copolymer was applied to the surface of test plates to form thereon absorptive surfaces and the film forming temperatures were measured by applying the emulsions to be tested to the absorptive surfaces.

Hardness: The coated surface was scratched by using Mitsubishi UNI Pencils (trademark, made by Mitsubishi Pencil Co., Ltd.) of 6B to 9H in hardness. The value of hardness was represented by the hardest pencil with which any scratch was not made (the softer grade next to the pencil which made scratches on the coated surface).

Adhesiveness: 100 checkered squares (1 × 1 mm) were made by cutting the coating film with a knife. A piece of self-adhesive tape was then applied to the cut squares and quickly peeled off. When the number of remained squares was n, the test result was indicated as (n/100).

Erichsen test: An Erichsen film tester was used at 20° C.

Impact resistance: Measured at 20° C. by using a weight of 500 g, 0.5 inch in diameter, and a Du Pont impact tester.

Gasoline resistance: Coating film was immersed in gasoline (made by Nippon Oil Co., Ltd.), and the time in which the coating film was not softened was measured.

Salt spray test: Measured according to JIS (Japanese Industrial Standards) Z 2371.

Water resistance: Test piece was immersed in water at 20° C. for 1 day, and then the occurrence of change in coating film was observed.

Table 1(a)

| Items | Ex. 1[*1] | Ex. 2 | Ex. 3 | Ex. 4 | C.Ex. 1[*2] | C.Ex. 2 |
|---|---|---|---|---|---|---|
| Compounding ratio of compound (A) (PHR) | 5 | 10 | 20 | 40 | — | — |
| Lowest film-forming temperature (° C) | 5 | <−10 | <−10 | <−10 | 20 | 16 |
| Hardness, 20° C, after 7 days | HB | F | B[*3] | B[*3] | 2B | B |
| Gel fraction, 20° C, after 1 day | 0 | 5 | 14 | 25 | 0 | 0 |
| After drying at 20° C for 7 days, Adhesiveness | 100/100 | 100/100 | 100/100 | 100/100 | 100/100 | 100/100 |
| Erichsen test (mm) | >8 | >8 | >8 | >8 | >8 | >8 |
| Impact resistance (cm) | 5 | 5 | 5 | 5 | 5 | 5 |
| Gasoline resistance (min.) | 5 | 10 | 10 | 15 | 5 | 5 |
| Salt spray test (1 day)[*4] | Δ | Δ | Δ | Δ | Δ | Δ |
| Water resistance[*4] | Ⓐ | Ⓐ | Ⓐ | Ⓐ | Ⓐ | Ⓐ |

Notes:
[*1] Ex. means Example.
[*2] Ex. means Comparative Example.
[*3] After 2 weeks, hardness became F.
[*4] The mark Δ means fair and the mark Ⓐ means poor.

Table 1(b)

| Items | Ex. 5 | C.Ex. 3 | Ex. 6 | C.Ex.4 | Ex. 7 | C.Ex.5 |
|---|---|---|---|---|---|---|
| Compounding ratio of compound (A) (PHR) | 5 | — | 5 | — | 5 | — |
| Lowest film-forming temperature (° C) | −4 | >20 | <−10 | −4 | <−10 | 0 |
| Hardness, 20° C after 7 days | HB | HB | HB | HB | HB | HB |
| Gel fraction, 20° C, after 1 day | 30 | 8 | 20 | 5 | 10 | 0 |
| After drying at 20° C for 7 days, Adhesiveness | 46/100 | 31/100 | 97/100 | 50/100 | 8/100 | 0/100 |
| Erichsen test (mm) | >8 | >8 | >8 | >8 | >8 | >8 |
| Impact resistance (cm) | 20 | 5 | >50 | >50 | >50 | 45 |
| Gasoline resistance (min.) | 5 | 5 | 5 | 5 | 15 | 15 |
| Salt spray test (1 day) | Δ | Δ | Ⓐ | Ⓐ | Ⓐ | Ⓐ |
| Water resistance | Ⓐ | Ⓐ | Ⓐ | Ⓐ | Ⓐ | Ⓐ |

The advantages of the present invention will be understood from the above results. Although the present invention has been described in connection with preferred examples thereof, many variations and modifications will now become apparent to those skilled in the art. It is preferred, therefore, that the present invention be limited not by the specific disclosure herein but only by the appended claims.

What is claimed is:

1. An aqueous coating composition which is prepared by radically polymerizing unsaturated vinyl monomer in the presence of a surface active agent of ionic or nonionic compound to produce an emulsion, and impregnating said emulsion with 0.1 to 150 parts per hundred resin solid content of said emulsion of a compound (A) represented by the general formula:

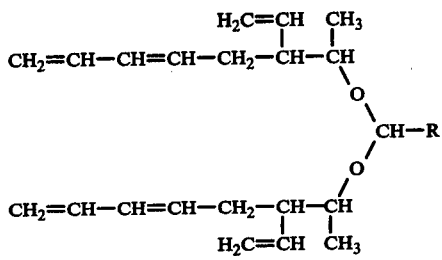

in which R is a hydrogen atom or an alkyl group having 1 to 18 carbon atoms, phenyl group, 1–18 carbon atom alkyl phenyl group, cyclohexyl group or 1–18 carbon atom alkyl cyclohexyl group.

2. An aqueous coating composition as claimed in claim 1, wherein said compound (A) is 1,1-bis(1'-methyl-2'-vinyl-4',6'-heptadienoxy)-alkane having R of an alkyl group having 1 to 18 carbon atoms or of a hydrogen atom.

3. An aqueous coating composition as claimed in claim 1, wherein before said emulsion is impregnated with said compound (A), said compound (A) is dispersed or solubilized in an oxidation curing water-soluble resin or surface active agent.

4. An aqueous coating composition as claimed in claim 1, wherein the quantity of said compound (A) to be added is 3 to 50 parts per hundred resin solid content of said emulsion.

5. An aqueous coating composition as claimed in claim 1, wherein said unsaturated vinyl monomer is at least one member selected from the group consisting of ethylene, propylene, butylene, vinyl chloride, vinylidene chloride, vinyl acetate,

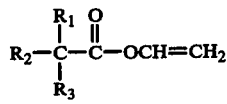

wherein $R_1$, $R_2$ and $R_3$ are alkyl, styrene, α-methylstyrene, vinyltoluene, vinylpyridine, butadiene, pentadiene, chloroprene, isoprene, acrylic acid, methacrylic acid, acrylic ester, methacrylic ester, glycidyl acrylate, glycidyl methacrylate, 2-hydroxyethyl methacrylate, 2-hydroxyethyl acrylate, 2-hydroxypropyl acrylate, 2-hydroxypropyl methacrylate, acrylonitrile and methacrylonitrile.

6. An aqueous coating composition as claimed in claim 1, wheren R is methyl.

7. An aqueous coating composition as claimed in claim 1, wherein said emulsion is a vinyl acetate/ethylene emulsion.

8. An aqueous coating composition as claimed in claim 1, wherein said emulsion is a styrene-butyl acrylate emulsion.

9. An aqueous coating composition as claimed in claim 1, wherein said emulsion contains

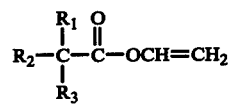

wherein $R_1$, $R_2$ and $R_3$ are alkyl, and vinyl acetate.

10. An aqueous coating composition as claimed in claim 1, wherein said emulsion contains styrene, n-butylacrylate, and acrylic acid.